H. M. PITMAN.
DETACHABLE AUTOMOBILE TIRE TREAD.
APPLICATION FILED SEPT. 11, 1909.
969,722.
Patented Sept. 6, 1910.
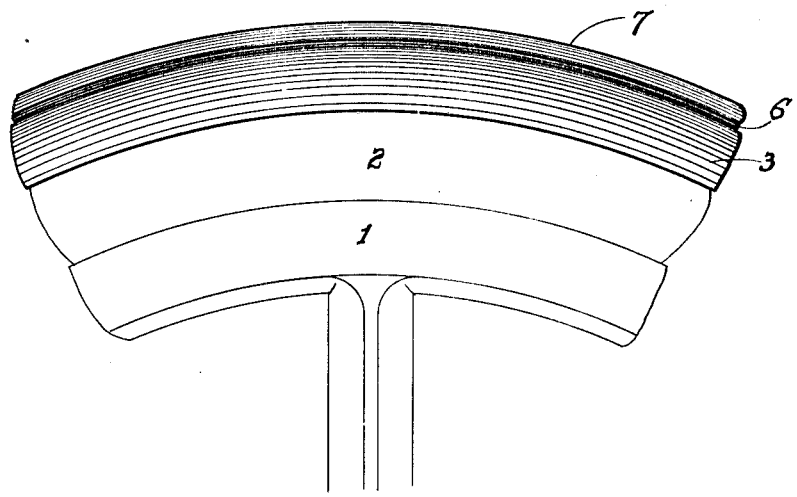
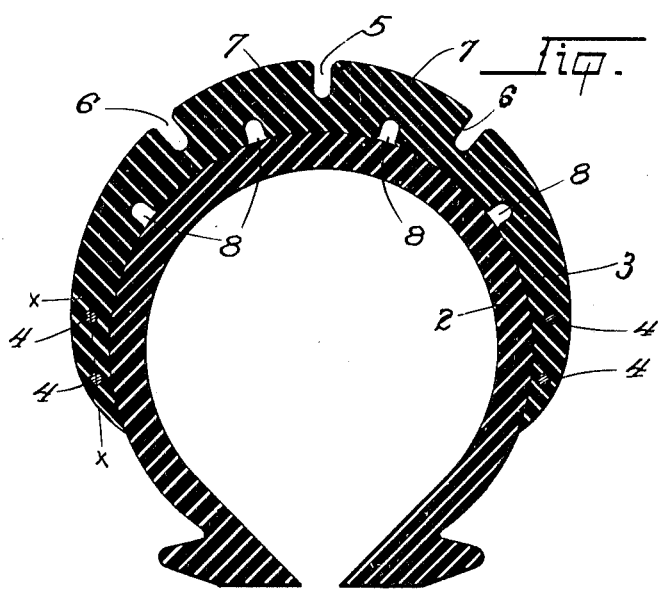
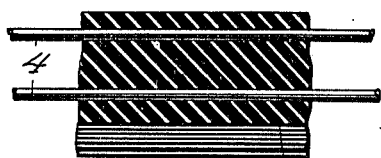
Witnesses
Frank H. Hart
H. Schweder
Inventor
Harry M. Pitman
By E. E. Trooman,
Attorney.

UNITED STATES PATENT OFFICE.

HARRY M. PITMAN, OF OAKLAND, CALIFORNIA.

DETACHABLE AUTOMOBILE-TIRE TREAD.

969,722.     Specification of Letters Patent.     Patented Sept. 6, 1910.

Application filed September 11, 1909. Serial No. 517,273.

*To all whom it may concern:*

Be it known that I, HARRY M. PITMAN, a citizen of the United States, residing at Oakland, in the county of Alameda and State of California, have invented certain new and useful Improvements in Detachable Automobile-Tire Treads, of which the following is a specification.

This invention relates to armors for inflatable tires and the principal object of the same is to provide an improved armor which is adapted to be fitted over the tread of a tire to both protect the tire from damage by punctures or the like and also to prevent slipping or skidding of the tire.

In carrying out the objects of the invention generally stated above it will, of course, be readily understood that the essential features of the invention are necessarily susceptible of changes in details and structural arrangements, one preferred and practical embodiment of which is shown in the accompanying drawings, wherein—

Figure 1 is a detail fragmentary view in side elevation of a wheel showing the tire thereof equipped with the improved armor or protector. Fig. 2 is an enlarged vertical sectional view of a tire and protector. Fig. 3 is a vertical sectional view taken substantially on the line $x$—$x$, Fig. 2.

Referring to said drawings by numerals, 1 designates a wheel rim, 2 the tire, and 3 the improved armor or protector which is adapted to be fitted over the tread surface thereof.

The improved armor or protector is preferably formed of rubber and fabric and has a thickened central or tread portion and tapering sides, said armor being curved to conform to the contour of the tire over which it is fitted, and provided adjacent each longitudinal edge with the continuous wires 4 which retain the armor to the desired shape and also serve to hold the same in position about a tire, as will be readily understood. The tread surface of the armor is provided with a number of longitudinal grooves spaced at a little distance apart from each other, said grooves being within the tread surface of the armor, the groove 5 being centrally located, and a groove 6 being spaced from the groove 5 on each side thereof. This arrangement of grooves affords smooth longitudinal surfaces 7, and the grooves 5 and 6 will grip the roadway over which the tire is traveling and prevent lateral slipping or skidding of the tire. The inner surface of the armor or protector is provided with four or more continuous longitudinal grooves 8, spaced apart and located within said inner surface of the armor, said grooves being shallower than the grooves 5 and 6 of the outer surface of the tread and are arranged in staggered relation to said grooves 5 and 6 so that each of said grooves 5 and 6 will have one of the grooves 8 on each side thereof. Said grooves 8 provide air channels between the armor and the tire and also provide the necessary lateral play of the armor relative to the tire without the liability of the armor moving bodily of said tire, such as is incidental to lateral strain exerted on an armor when turning corners &c. And it will also be understood that said grooves 8 also provide cushioning surfaces between the armor and the tire.

It will be apparent from the foregoing that the improved armor provides effective means for both protecting the tire from puncture and also from "skidding," and through the described arrangement of inner and outer grooves, cushioning channels are provided between the armor and the tire which also permit the necessary lateral play of the protector without danger of the protector or armor being damaged thereby.

What I claim as my invention is:—

1. A device of the character described, comprising a resilient tread armor, shaped to conform to the contour of the tread portion of a tire, and having longitudinal grooves located within the outer face of its tread surface and within its inner surface and spaced apart from each other, the grooves in one surface being arranged in staggered relation to the grooves in the other surface.

2. A device of the character described comprising a resilient tread armor, having a thickened central or tread portion and tapering sides, the tread portion of the armor being formed with a central longitudinal groove within the outer face of its surface, and with longitudinal grooves spaced apart from said central groove and parallel thereto, and the inner surface of said armor having longitudinal grooves within its surface and spaced apart from each other, said grooves being within said inner surface and shallower than the grooves in the tread surface, and arranged in staggered relation thereto, and means for securing the armor to a tire.

In testimony whereof I affix my signature in presence of two witnesses.

HARRY M. PITMAN.

Witnesses:
E. P. VAUGHAN,
H. C. SCHROEDER.